Sept. 28, 1926. 1,601,017
L. A. FRYE ET AL
MOTOR DRIVEN MONORAIL TRUCK
Filed Oct. 14, 1924

Inventors;
Lewis A. Frye,
William A. Geller;
By R. S. Berry
Attorney

Patented Sept. 28, 1926.

1,601,017

UNITED STATES PATENT OFFICE.

LEWIS A. FRYE AND WILLIAM A. GELLER, OF LOS ANGELES, CALIFORNIA.

MOTOR-DRIVEN MONORAIL TRUCK.

Application filed October 14, 1924. Serial No. 743,551.

This invention relates to trucks of the type employed in monorail railway systems in which the truck is fitted with wheels adapted to traverse a single overhead track, and particularly pertains to the driving mechanism for propelling the truck.

In monorail overhead railway systems in which the car or coach is suspended from one or more aligned trucks supported on a single overhead rail and maintained substantially vertical therein by stable equilibrium, and in which the truck is provided with two or more aligned wheels arranged to travel on a single rail track, it is desirable to mount a driving mechanism directly on the truck frame at a point between the truck wheels and directly above the monorail track.

An object of this invention is to provide a truck-driving mechanism embodying the above desirable feature, in which the truck and the driving mechanism are so constructed and arranged that the motor may be carried on the truck frame in close proximity to one of the truck wheels, and the motor and the gear connections between the motor and drive wheel so situated as to equally distribute the load on opposite sides of the longitudinal center of the truck so that the truck will be substantially balanced on the track.

Another object is to provide means in a single-wheel drive of a truck of the above character whereby the driving power will be uniformly applied to the drive wheel shaft on opposite sides of the wheel from a single motor to effect equalization of the driving stress imposed on the drive shaft and wheel.

A further object is to provide a gear connection between a motor fixedly mounted on a truck frame and a single drive wheel fixed on an axle carried in bearings on the frame, and which bearing, axle and wheel are mounted to have vertical movement relative to the frame.

With the foregoing objects in view together with such other objects and advantages as may subsequently appear, my invention resides in the parts and in the construction, combination and arrangement of parts hereinafter described and claimed and illustrated by way of example in the accompanying drawings, in which—

Figure 1:
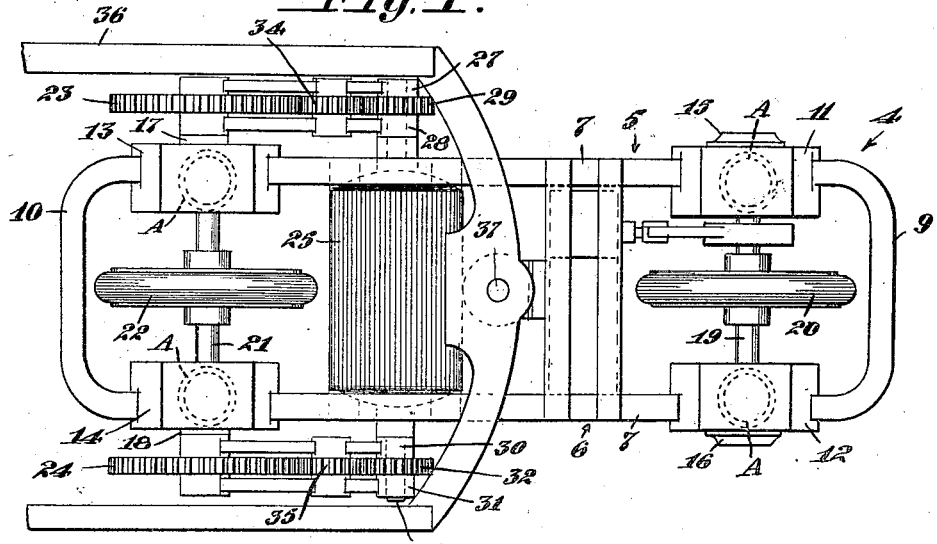
Figure 1 is a plan view of a monorail truck, showing the invention as applied.
Figure 2:
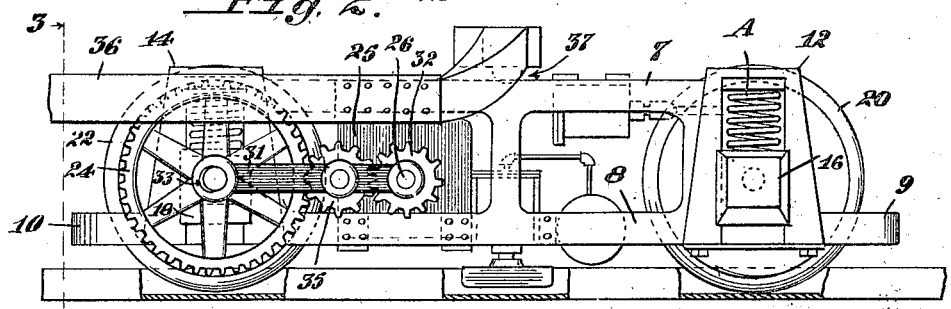
Figure 2 is a view of the truck shown in Figure 1, as seen in side elevation.
Figure 3:
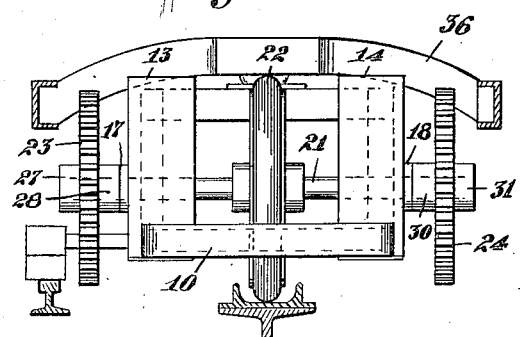
Figure 3 is an end view of the truck as seen on the line 3—3 of Figure 2, in the direction indicated by the arrow.

Referring to the drawings more specifically, 4 indicates a truck frame which embodies spaced side frames 5 and 6, each of which comprises spaced, top and bottom rails 7 and 8 respectively, suitably connected together; the frame members 5 and 6 being here shown as connected together by end rails 9 and 10 arranged in continuation of the bottom rails 8. Erected on the side frames 5 and 6 adjacent the end rails 9 and 10 are pairs of guideways 11—12 and 13—14, respectively, in which guideways journal boxes of appropriate design are mounted for vertical movement; there being opposed journal boxes 15 and 16 mounted in the guideways 11—12, and opposed journal boxes 17 and 18 mounted on the guideways 13—14. Supported in the journal boxes 15 and 16 is a shaft or axle 19 on which is fixed a wheel 20 which wheel constitutes a pilot wheel and is located midway between the side frames 5 and 6 adjacent the forward end rail 9. Mounted in the journal boxes 17 and 18 is a shaft or axle 21 on which is fixed a driving wheel 22 located midway between the side wheels 5 and 6 adjacent the rear end rail of the truck and disposed in alignment with the pilot wheel 20. Springs A are arranged in each guideway against which the journal boxes bear upwardly; the springs serving to yieldably oppose relative vertical movement of the truck frame and wheel shafts and also cushion the load carried by the truck.

In carrying out our invention the shaft 21 is extended through the journal boxes 17 and 18 and has spur toothed wheels 23—24 fixed on their outer ends and spaced from the side frames 5 and 6 and from the outer faces of the journal boxes 17 and 18.

Mounted on the truck frame and extending transversely thereof in close proximity to the drive wheel 22 is a motor 25, the driving shaft 26 of which extends transversely of the truck frame and projects from the ends of the motor; the motor shaft being disposed parallel to the drive wheel shaft 21 and preferably with its axis on a plane extending horizontally through the axis of the shaft 21. Mounted on one end of the shaft 26 is a pair of links 27 and 28 which extend astride a toothed pinion 29 on the motor shaft 26, and mounted on the other end of the shaft 26 is a pair of links 30 and 31 which extend astride a toothed pinion 32 on the shaft 26. The links 27—28 and 30—31 extend astride the toothed wheels 23 and 24 and have apertures 33 through which the drive wheel shaft 21 extends; the aperture 33 being elongated to permit the links to oscillate on rectilinear movement of the shaft 21 relative to the truck frame.

Suitably mounted between each pair of the links are idler gears 34—35; the idler gear 34 meshing with the toothed wheel 23 and with the pinion 29, and the idler gear 35 meshing with the toothed wheel 24 and the pinion 32.

It will now be seen that on rotation of the motor drive shaft 26 rotary motion will be transmitted to the drive wheel shaft 21 through the pinions 29 and 32, idler gears 34—35, and the toothed wheels 23—24 so that the driving stress will be imparted to the drive wheel shaft 21 equally on opposite sides of the drive wheel 22, thus effecting an equal application of power to each side of the single drive wheel.

This arrangement is further advantageous in that the load of the driving mechanism is distributed equally on opposite sides of the longitudinal center of the truck so that the center of gravity of the truck structure will be normally on a plane extending vertically through the tread portion of the aligned wheels 20—22, which is a desirable feature in trucks of this character where the structure is supported on a single overhead rail.

The truck as here shown constitutes one truck member of a multiple truck structure which embodies a substantially rectangular frame 36 each end of which is carried on corresponding truck frames 4; the ends of the main truck frames 36 being supported on and connected to the truck frame 4 by suitable bearings and connections as indicated at 37.

What we claim is—

1. In a truck for suspended monorail systems, in combination, a frame, supports therein for a driving wheel shaft, a driving wheel shaft mounted in said supports and extending between the sides of said frame and having extensions outwardly of each side of said frame, a driving wheel mounted on said shaft between the sides of said frame, a motor shaft extending between the sides of said frame and having extensions extending outwardly through both sides of said frame, a motor mounted on said frame for operating said motor shaft, a toothed wheel mounted on each extension of said driving wheel shaft, pinions on each end of said motor shaft, each pinion on said motor shaft being spaced apart from, and in alignment with, the corresponding toothed wheel on the driving wheel shaft, and an idler gear interposed between each pinion and the corresponding toothed wheel.

2. In a truck for suspended monorail systems, in combination, a frame, supports therein for a driving wheel shaft, a driving wheel shaft mounted in said supports and extending between the sides of said frame and having its ends extending outwardly from either side of said frame, a driving wheel mounted on said shaft between the sides of said frame, a motor shaft extending between the sides of said frame in front of said driving wheel shaft, parallel therewith and having extensions projecting outwardly at both sides of said frame, a motor mounted on said frame for operating said motor shaft, a toothed wheel mounted on each end extension of said driving wheel shaft, pinions on each end of said motor shaft, each pinion on said motor shaft being spaced apart from, and in alignment with, the corresponding toothed wheel on the driving wheel shaft, and an idler gear interposed between each pinion and the corresponding toothed wheel.

3. In a truck for suspended monorail systems, in combination, a frame, supports therein for a driving wheel shaft, a driving wheel shaft mounted in said supports and extending between the sides of said frame and having end extensions outwardly of each side of said frame, a single driving wheel mounted on said shaft between the sides of said frame, a motor shaft extending between the sides of said frame and having extensions projecting outwardly through both sides of said frame, a motor for operating said motor shaft, a toothed wheel mounted on each end extension of said driving wheel shaft, a pinion on each end of said motor shaft, each pinion on said motor shaft being spaced apart and in alignment with the corresponding toothed wheel on the driving wheel shaft, an idler gear interposed between each pinion and its corresponding toothed wheel, and supports for each of said idler gears, said supports comprising members mounted at one end on said motor shaft and at the other end on the driving wheel shaft.

4. In a truck for suspended monorail systems, in combination, a frame, supports therein for a driving wheel shaft, a driving wheel shaft mounted in said supports and extending between the sides of said frame and having end extensions outwardly of each side of said frame, a driving wheel mounted on said shaft between the sides of said frame, a motor shaft extending between the sides of said frame and having end extensions projecting outwardly through both sides of said frame, a motor mounted on said frame, a toothed wheel mounted on each end extension of said driving wheel shaft, a pinion on each end extension of said motor shaft, each pinion on said motor shaft being spaced apart from, and in alignment with, the corresponding toothed wheel on the driving wheel shaft, an idler gear interposed between each pinion and its corresponding toothed wheel, supports for each of said idler gears, said supports comprising members mounted at one end on said motor shaft and at the other end of the driving wheel shaft, the mounting of said members on said driving wheel shafts being adapted to allow play of said members relative to the extension on which it is mounted.

5. In a truck for suspended monorail systems, a truck frame, a driven shaft journaled on said frame, a traction wheel on said shaft, a drive shaft, a motor for rotating said drive shaft, means for transmitting motion from said drive shaft to said driven shaft, a link having one end pivoted on the drive shaft and its opposite end pivoted on said driven shaft, said link being formed with an elongated opening through which the driven shaft extends to permit vertical movement of said driven shaft relative to the drive shaft and to the truck frame.

6. In a truck for suspended monorail systems, a truck frame, a driven shaft journaled on said frame and mounted for rectilinear movement relatively thereto, a single traction wheel on said shaft, a drive shaft journalled on said frame, a motor for rotating said drive shaft, a pair of links pivotally connected to drive shaft and to the driven shaft, an idler toothed gear carried by each of said links, a pair of toothed driving pinions fixed on the drive shaft meshing with said idler gears; the toothed gears on the driven shaft being arranged on opposite sides of the traction wheel; and means for permitting oscillation of said links on vertical rectilinear movement of said driven shaft relatively to the truck frame.

LEWIS A. FRYE.
WILLIAM A. GELLER.